D. T. FISHER.
LOCOMOTIVE.
APPLICATION FILED APR. 16, 1910.
1,053,981.
Patented Feb. 25, 1913.
2 SHEETS—SHEET 1.
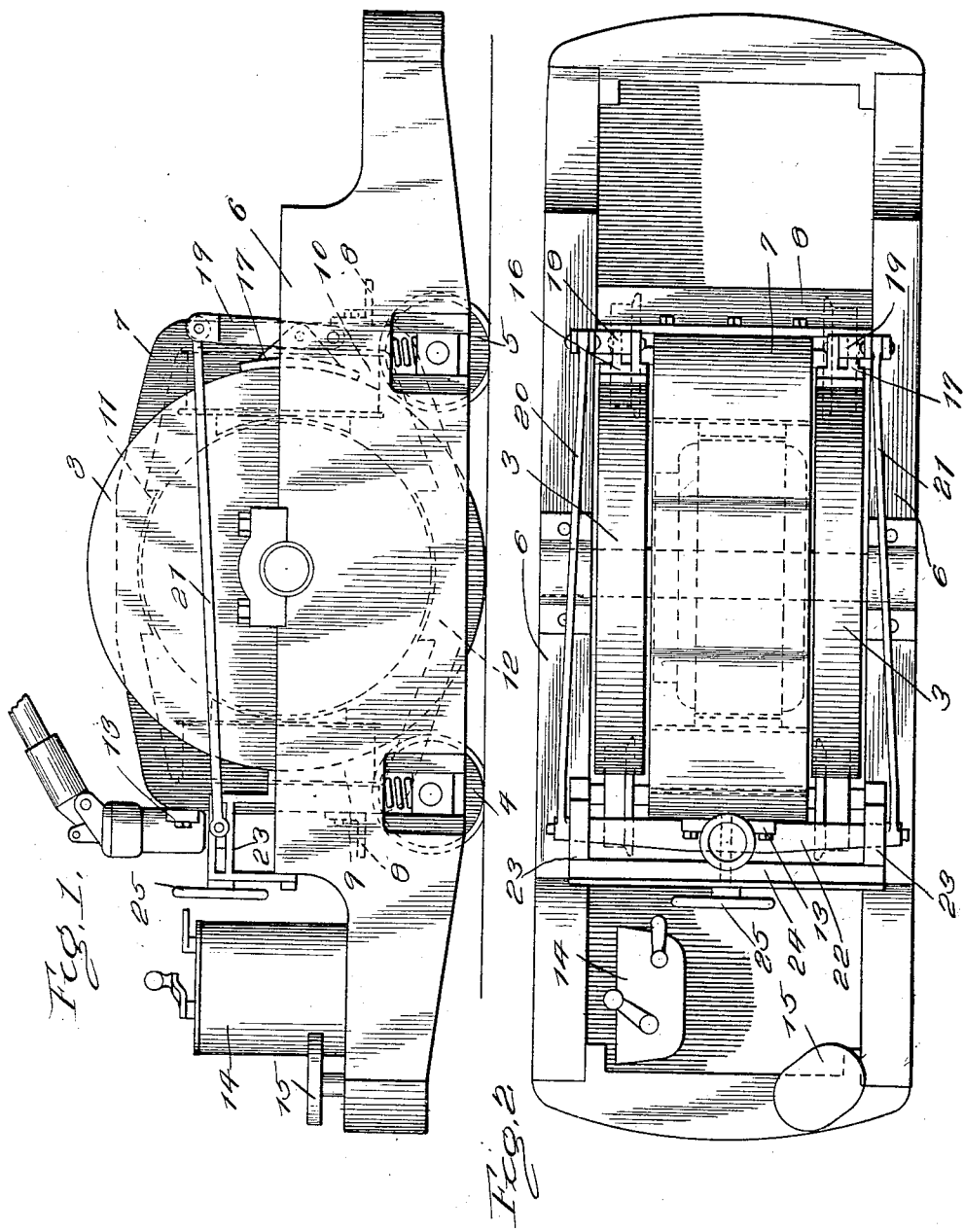
Witnesses
B. G. Bram
George R. Bliss
Inventor
Dudley T. Fisher
By H. H. Bliss
Attorney

D. T. FISHER.
LOCOMOTIVE.
APPLICATION FILED APR. 16, 1910.

1,053,981.

Patented Feb. 25, 1913.
2 SHEETS—SHEET 2.

Witnesses
B. E. Brann
George R. Bliss

Inventor
Dudley T. Fisher
By D. H. Bliss
Attorney

UNITED STATES PATENT OFFICE.

DUDLEY T. FISHER, OF COLUMBUS, OHIO, ASSIGNOR TO THE JEFFREY MANUFACTURING COMPANY, A CORPORATION OF OHIO.

LOCOMOTIVE.

1,053,981.    Specification of Letters Patent.    Patented Feb. 25, 1913.

Application filed April 16, 1910. Serial No. 555,788.

*To all whom it may concern:*

Be it known that I, DUDLEY T. FISHER, a citizen of the United States, residing at Columbus, in the county of Franklin and State of Ohio, have invented certain new and useful Improvements in Locomotives, of which the following is a specification, reference being had therein to the accompanying drawing.

This invention relates to electric locomotives of the type especially designed for use in mines and has for its object the production of a gearless locomotive with large armature and a short wheel base.

The invention therefore consists in the structure and combination of parts substantially as hereinafter set forth and claimed.

Figure 3:
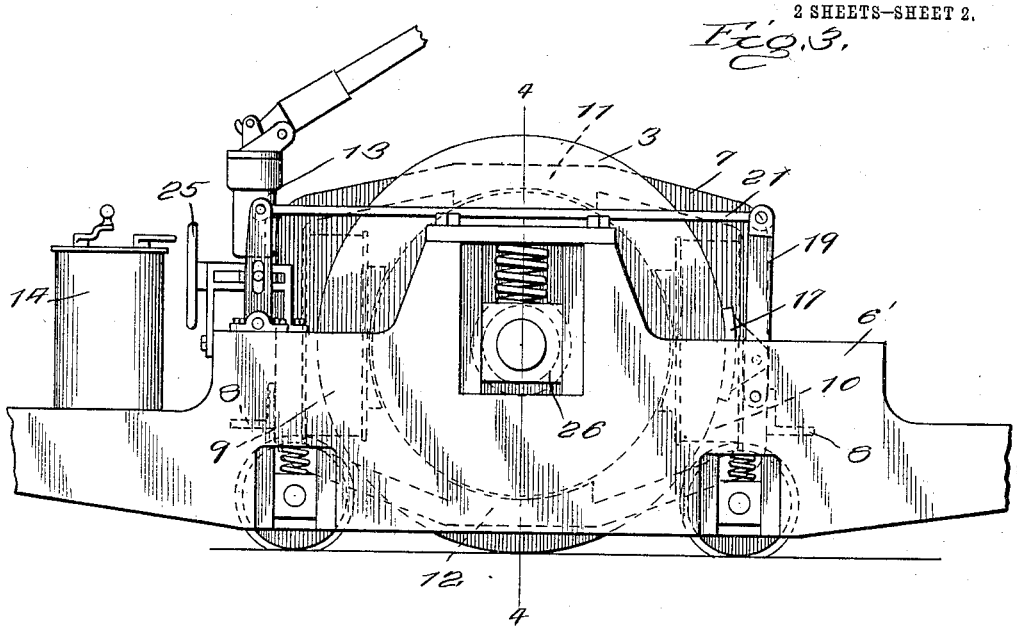
Figure 4:
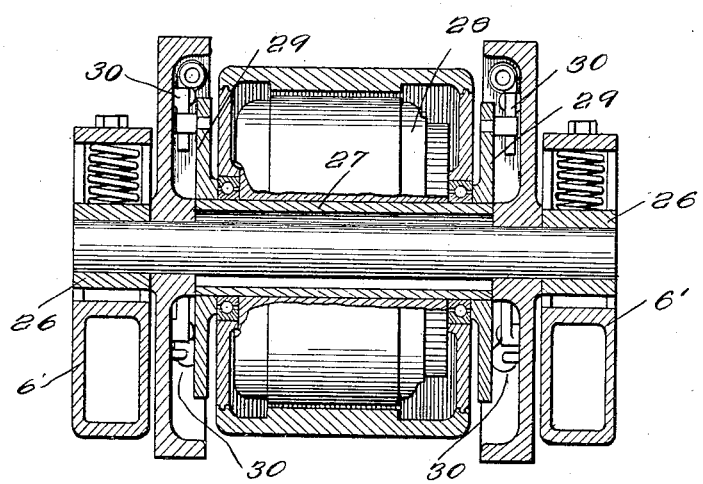

In the accompanying drawings Figure 1 represents in side elevation a locomotive embodying the present invention; Fig. 2 is a plan of the same; Fig. 3 represents in side elevation a modification of the locomotive seen in Fig. 1; and Fig. 4 represents a vertical, transverse section through the locomotive of Fig. 3 taken in the plane indicated by the line 4—4.

This invention contemplates the structure of a locomotive whose wheel base shall be as short as possible and whose driving wheel and armature shall be as large as possible. In the embodiment of the invention as illustrated in the drawings, the driving wheels are indicated at 3 and the guide wheels at 4 and 5. The driving wheels are preferably of wide rim and flangeless while the guide wheels are flanged and, as will be noticed, they are located as close as practicable to the driving wheels, thus giving to the locomotive a short wheel base. The short wheel base and flangeless driving wheels insure easy negotiation of short curves in the track or tramway. The driving wheels are journaled in fixed bearings in the frame 6 of the locomotive, Fig. 1, while the guide wheels are journaled in boxes spring mounted in said frame, the springs being gaged so that the guide wheels shall take only enough of the weight of the locomotive to insure trackage, the frame being practically balanced upon the driving axle.

The motor frame 7 may be mounted in the frame 6 in any suitable way as by means of angle bars 8 extending from side to side of the locomotive frame. The motor frame preferably extends laterally from wheel to wheel and carries at its ends field magnets 9 and 10 and at its upper and lower sides consequent pole pieces 11 and 12. By this arrangement of the field magnets the diameter of the armature is increased.

When this locomotive is used with an overhead conductor the trolley stand may be attached to the rear end of the motor frame as indicated at 13. The controller and operator's seat may be located in the frame 6 at the rear end as indicated at 14 and 15.

The brake mechanism well adapted to the locomotive described, has two brake shoes 16 and 17 carried by levers 18 and 19 which are in turn pivoted to the sides of the frame 6. From the upper ends of the levers, rods as 20 and 21 lead back to a cross beam 22 which is mounted at its ends in guides 23. From one of these guides to the other extends connecting plate 24, through which passes a screw into the beam 22. On the end of this screw is a hand wheel 25 by means of which the brakes are operated.

If desired springs may be interposed between the driving axle and the locomotive frame. This may be done substantially as indicated in Figs. 3 and 4 wherein spring mounted journal boxes 26 for the axle are located in the frame 6'. Then to provide for the consequent movement between the motor, which is fixed to the frame 6, and the axle, a sleeve as 27 larger than the axle extends around it from wheel to wheel. Upon this sleeve the armature 28 with its commutator is fixed, the sleeve being journaled for rotation in the sides of the motor frame. Upon the ends of the sleeve are fixed disks as 29 which are connected to the driving wheels 3 by means of any suitable yielding connections typified at 30. This latter manner of mounting the motor and connecting it to the driving wheels is more specifically described and illustrated in my copending application, Serial No. 555,787.

Locomotives embodying my invention are especially intended for under-ground use in mines or in freight tunnels. In locomotives of this class great power is required but at the same time the external dimensions of the locomotive must be kept within certain relatively small limits. It is also very desirable, and in fact essential, when a locomotive is being used for mines that the electrical parts of the motor be inclosed, not only to exclude dust and dirt, but also to exclude explosive gases which are frequently met with and which might be fired by sparks from the commutator. In the construction which I have shown and described there is provided a very powerful and at the same time compact motor arrangement which is inclosed in a tight casing. It will be observed that the poles at the top and at the bottom of the motor armature are consequent ones and that, therefore, it is possible to use a very large motor armature without unduly increasing the height of the locomotive.

The invention claimed is:—

1. In an electric locomotive, the combination of a locomotive frame, large driving wheels located at the longitudinal center of the frame, a motor operatively connected to the driving wheels and mounted for rotation concentric therewith, and small spring mounted guiding and balancing wheels arranged to engage the same track wheels as the driving wheels and located as close as practical to the driving wheels.

2. In an electric locomotive, the combination of the locomotive frame, large, flangeless driving wheels upon the axle of which said frame is practically balanced, small, flanged guiding wheels located in the same vertical longitudinal planes with the driving wheels, and springs for the journals of said guiding wheels gaged to take only sufficient weight of the locomotive to insure trackage.

3. In an electric locomotive, the combination with the locomotive frame, of a motor frame mounted vertically therein and carrying field magnets at its ends and consequent poles at its upper and lower sides, a driving axle passed centrally through the motor frame, a large armature fixed upon said axle, flangeless driving wheels of a diameter greater than the armature fixed to the axle beyond the ends of the armature, and suitable guiding means for trackage secured to the locomotive frame at either side of the driving wheels.

In testimony whereof I affix my signature, in presence of two witnesses.

DUDLEY T. FISHER.

Witnesses:
E. R. MERRILL,
E. P. SNIVELY.

---

Copies of this patent may be obtained for five cents each, by addressing the "Commissioner of Patents, Washington, D. C."